(12) United States Patent
Frampton et al.

(10) Patent No.: US 9,991,709 B2
(45) Date of Patent: Jun. 5, 2018

(54) ADDING AND SHEDDING LOADS USING LOAD LEVELS TO DETERMINE TIMING

(75) Inventors: Isaac S. Frampton, Strattanville, PA (US); Kenneth R. Bornemann, Cato, WI (US); Harrison C. Chiu, Grafton, WI (US)

(73) Assignee: Kohler Co., Kohler, WI (US)

( * ) Notice: Subject to any disclaimer, the term of this patent is extended or adjusted under 35 U.S.C. 154(b) by 1540 days.

(21) Appl. No.: 13/289,131

(22) Filed: Nov. 4, 2011

(65) Prior Publication Data

US 2013/0116847 A1 May 9, 2013

(51) Int. Cl.
G06F 1/28 (2006.01)
H02J 3/14 (2006.01)
H02J 9/04 (2006.01)

(52) U.S. Cl.
CPC . *H02J 3/14* (2013.01); *H02J 9/04* (2013.01); *Y02B 70/3225* (2013.01); *Y04S 20/222* (2013.01)

(58) Field of Classification Search
CPC .................................................. H02J 9/00
USPC ........................................................ 700/296
See application file for complete search history.

(56) References Cited

U.S. PATENT DOCUMENTS

| 4,031,406 A | 6/1977 | Leyde et al. |
| 4,034,233 A | 7/1977 | Leyde |
| 4,064,485 A | 12/1977 | Leyde |
| 4,099,067 A | 7/1978 | Szentes et al. |
| 4,639,657 A | 1/1987 | Frierdich |
| 4,701,690 A | 10/1987 | Fernandez et al. |
| 4,731,547 A | 3/1988 | Alenduff et al. |
| 4,800,291 A | 1/1989 | Bowers |
| 5,294,879 A | 3/1994 | Freeman et al. |
| 5,414,640 A | 5/1995 | Seem |
| 5,422,517 A | 6/1995 | Verney et al. |
| 5,604,421 A | 2/1997 | Barnsley |
| 5,640,060 A | 6/1997 | Dickson |

(Continued)

FOREIGN PATENT DOCUMENTS

| CN | 1836198 | 9/2006 |
| EP | 1739806 | 1/2007 |

OTHER PUBLICATIONS

"International Application Serial No. PCT/US2012/062967, International Preliminary Report on Patentability mailed May 15, 2014", 8 pgs.

(Continued)

*Primary Examiner* — Mohammad Ali
*Assistant Examiner* — Emilio J Saavedra
(74) *Attorney, Agent, or Firm* — Schwegman Lundberg & Woessner, P.A.

(57) ABSTRACT

Some embodiments relate to a method of adding and shedding loads that are connected to a generator. The method includes determining whether a plurality of loads is being supplied with power by the generator and then determining the total load that the generator is supplying to the plurality of loads. The method further includes determining whether to change a number of the loads in the plurality of loads based on the amount of load L that is being supplied by the generator. The method further includes determining an amount of time T in which to change the number of loads in the plurality of loads based on the amount of load that is being supplied by the generator.

30 Claims, 8 Drawing Sheets

(56) References Cited

U.S. PATENT DOCUMENTS

| | | | |
|---|---|---|---|
| 5,684,710 A | 11/1997 | Ehlers et al. | |
| 5,761,073 A | 6/1998 | Dickson | |
| 5,861,683 A | 1/1999 | Engel et al. | |
| 5,880,537 A | 3/1999 | Windhorn | |
| 6,104,171 A | 8/2000 | Dvorsky et al. | |
| 6,107,927 A | 8/2000 | Dvorsky et al. | |
| 6,163,088 A | 12/2000 | Codina et al. | |
| 6,172,432 B1 | 1/2001 | Schnackenberg et al. | |
| 6,191,500 B1 | 2/2001 | Toy | |
| 6,552,888 B2 | 4/2003 | Weinberger | |
| 6,631,310 B1 | 10/2003 | Leslie | |
| 6,653,821 B2 | 11/2003 | Kern et al. | |
| 6,657,416 B2 | 12/2003 | Kern et al. | |
| 6,668,629 B1 | 12/2003 | Leslie | |
| 6,686,547 B2 | 2/2004 | Kern et al. | |
| 6,739,145 B2 | 5/2004 | Bhatnagar | |
| 6,747,368 B2 | 6/2004 | Jarrett, Jr. | |
| 6,798,187 B1 | 9/2004 | Czarnecki | |
| 6,801,019 B2 | 10/2004 | Haydock et al. | |
| 6,833,694 B2 | 12/2004 | Ikekame | |
| 6,876,103 B2 | 4/2005 | Radusewicz | |
| 6,912,889 B2 | 7/2005 | Staphanos et al. | |
| 6,983,640 B1 | 1/2006 | Staphanos et al. | |
| 7,015,599 B2 | 3/2006 | Gull | |
| 7,053,497 B2 | 5/2006 | Sodemann et al. | |
| 7,133,787 B2 | 11/2006 | Mizumaki | |
| 7,146,256 B2 | 12/2006 | Hibi et al. | |
| 7,149,605 B2 | 12/2006 | Chassin et al. | |
| 7,177,612 B2 | 2/2007 | Nakamura et al. | |
| 7,177,728 B2 | 2/2007 | Gardner | |
| 7,208,850 B2 | 4/2007 | Turner | |
| 7,218,998 B1 | 5/2007 | Neale | |
| 7,230,345 B2 | 6/2007 | Winnie et al. | |
| 7,239,045 B2 | 7/2007 | Lathrop | |
| 7,245,036 B2 | 7/2007 | Endou et al. | |
| 7,274,974 B2 | 9/2007 | Brown | |
| 7,336,003 B2 | 2/2008 | Lathrop et al. | |
| 7,345,456 B2 | 3/2008 | Gibbs et al. | |
| 7,356,384 B2 | 4/2008 | Gull et al. | |
| 7,446,425 B2 | 11/2008 | Sato | |
| 7,514,815 B2 | 4/2009 | Paik et al. | |
| 7,521,822 B2 | 4/2009 | Lorenz | |
| 7,557,544 B2 | 7/2009 | Heinz et al. | |
| 7,573,145 B2 | 8/2009 | Peterson | |
| 7,579,712 B2 | 8/2009 | Yanagihashi et al. | |
| 7,582,986 B2 | 9/2009 | Folkers et al. | |
| 7,598,623 B2 | 10/2009 | Fattal et al. | |
| 7,608,948 B2 | 10/2009 | Nearhoof et al. | |
| 7,619,324 B2 | 11/2009 | Folken et al. | |
| 7,656,060 B2 | 2/2010 | Algrain | |
| 7,687,929 B2 | 3/2010 | Fattal | |
| 7,715,951 B2 | 5/2010 | Forbes, Jr. et al. | |
| 7,747,355 B2 | 6/2010 | Bulthaup et al. | |
| 7,778,737 B2 | 8/2010 | Rossi et al. | |
| 7,786,616 B2 | 8/2010 | Naden et al. | |
| 7,795,851 B2 | 9/2010 | Ye et al. | |
| 7,854,283 B2 | 12/2010 | Vos et al. | |
| 2003/0107349 A1 | 6/2003 | Haydock et al. | |
| 2004/0051515 A1 | 3/2004 | Ikekame | |
| 2004/0075343 A1 | 4/2004 | Wareham et al. | |
| 2005/0059373 A1 | 3/2005 | Nakamura et al. | |
| 2005/0063117 A1 | 3/2005 | Amano et al. | |
| 2005/0072220 A1 | 4/2005 | Staphanos et al. | |
| 2005/0116814 A1 | 6/2005 | Rodgers et al. | |
| 2005/0128659 A1 | 6/2005 | Hibi et al. | |
| 2005/0188745 A1 | 9/2005 | Staphanos et al. | |
| 2005/0216131 A1* | 9/2005 | Sodemann et al. ............ 700/295 |
| 2006/0112688 A1* | 6/2006 | Vos et al. .......................... 60/598 |
| 2006/0187600 A1 | 8/2006 | Brown et al. | |
| 2006/0203814 A1 | 9/2006 | Ye et al. | |
| 2006/0284843 A1 | 12/2006 | Endou et al. | |
| 2007/0010916 A1 | 1/2007 | Rodgers et al. | |
| 2007/0120538 A1 | 5/2007 | Sato | |
| 2007/0129851 A1 | 6/2007 | Rossi et al. | |
| 2007/0222294 A1* | 9/2007 | Tsukida et al. ................. 307/29 |
| 2007/0222295 A1 | 9/2007 | Wareham | |
| 2007/0273214 A1 | 11/2007 | Wang et al. | |
| 2008/0157593 A1 | 7/2008 | Bax et al. | |
| 2008/0157600 A1 | 7/2008 | Marlenee et al. | |
| 2009/0108678 A1 | 4/2009 | Algrain | |
| 2009/0113874 A1 | 5/2009 | McKee | |
| 2009/0152951 A1 | 6/2009 | Algrain | |
| 2009/0179498 A1 | 7/2009 | Lathrop et al. | |
| 2009/0195224 A1 | 8/2009 | Kim | |
| 2009/0198386 A1 | 8/2009 | Kim et al. | |
| 2009/0216386 A1 | 8/2009 | Wedel | |
| 2009/0240377 A1 | 9/2009 | Batzler et al. | |
| 2009/0290270 A1 | 11/2009 | Ganev et al. | |
| 2010/0007313 A1 | 1/2010 | Jakeman et al. | |
| 2010/0019574 A1 | 1/2010 | Baldassarre et al. | |
| 2010/0038966 A1 | 2/2010 | Espeut, Jr. | |
| 2010/0039077 A1 | 2/2010 | Dalby | |
| 2010/0066551 A1 | 3/2010 | Bailey et al. | |
| 2010/0094475 A1 | 4/2010 | Masters et al. | |
| 2010/0102637 A1 | 4/2010 | Dozier et al. | |
| 2010/0109344 A1 | 5/2010 | Conway et al. | |
| 2010/0148588 A1 | 6/2010 | Algrain | |
| 2010/0156117 A1 | 6/2010 | Allen | |
| 2010/0156191 A1 | 6/2010 | Dozier et al. | |
| 2010/0225167 A1 | 9/2010 | Stair et al. | |
| 2011/0109291 A1 | 5/2011 | Tang et al. | |
| 2011/0215645 A1 | 9/2011 | Schomburg et al. | |

OTHER PUBLICATIONS

"International Application Serial No. PCT/US2012/062967, International Search Report mailed Jan. 11, 2013", 2 pgs.

"International Application Serial No. PCT/US2012/062967, Written Opinion mailed Jan. 11, 2013", 6 pgs.

"Chinese Application No. 201280049499.4, Office Action dated Jul. 24, 2015", (Jul. 24, 2015), 11 pgs.

"European Application No. 12846078.9, Extended European Search Report dated Nov. 23, 2015", (Nov. 23, 2015), 8 pgs.

"Chinese Application No. 201280049499.4, Office Action dated Aug. 22, 2016", w/ English Translation, (Aug. 22, 2016), 10 pgs.

"Chinese Application No. 201280049499.4, Office Action dated Jan. 8, 2016", w/ English Summary, 7 pgs.

"Chinese Application No. 201280049499.4, Office Action dated Feb. 7, 2017", w/English Translation, (Feb. 7, 2017), 8 pgs.

\* cited by examiner

ADDING AND SHEDDING LOADS USING LOAD LEVELS TO DETERMINE TIMING

TECHNICAL FIELD

Embodiments pertain to a system and method for adding and shedding loads, and more particularly to a system and method for adding and shedding loads using load levels to determine timing.

BACKGROUND

The process of prioritizing loads that are connected to a power supply that has limited capacity is typically referred as load shedding. As an example, power may be supplied by a standby generator where load shedding is required because the standby generator has a capacity that is less than the requirements of the entire attached load.

Water heaters and air conditioners are among the commonly utilized devices that are powered loads by a power source (e.g., a generator). These loads may need to be shed when a residence is being supplied by a limited capacity generator. Existing load shedding systems typically prioritize each load and then determine if the limited capacity power source is able to supply the loads before adding each load. If the limited capacity power source becomes overloaded, then the load control system will remove one or more loads to allow the power source to continue supplying power to the more important connected loads.

Utilizing a load shedding system may allow a smaller standby generator to be installed thereby decreasing the generator costs that are associated with powering a facility. In addition, load shedding may decrease costs by limiting the peak demand for power during certain times of the day because such systems often allow a power generation utility to keep a less efficient generation plant offline and then pass the savings on to the customer (i.e., the generator user).

One of the drawbacks with existing load shedding systems is that although custom-designed and configured load shedding schemes work well under some conditions; many load shedding systems do not work well when operating a variety of loads under a variety of conditions.

One of the biggest challenges for a load shedding system is a high-priority switching load. In one example scenario, a high-priority switching load may be deactivated which allows less important loads to be added. Therefore, once the high-priority switching load is eventually turned on, the power source becomes overloaded. The load shedding system must then shed several loads before the load that is actually causing the overload is removed. The additional time that is required to shed multiple loads increases the likelihood of the power source becoming overloaded for an undesirable period of time. Although many existing load shedding systems are customized in an attempt to minimize unintended power source dropouts, such systems are still often unable to adequately handle high-priority switching loads.

Another drawback with conventional load shedding systems is that in some scenarios, all of the loads may not be drawing power from the generator during an overload condition. As an example, six loads may be activated by the system even though only two of the loads are actually drawing power. As a result, when an overload occurs after all these loads have been added, the system may have to take unnecessary time to shed as many as five loads before actual load on the power source decreases at all. This increase in time to shed the appropriate load could result in the power source going offline.

Load shedding systems must also typically be carefully configured in order to work in each application because standard load shedding logic does not accurately match the load profile of a typical power source or a typical motor load. As a result, these existing systems are typically unable to start large motors that would otherwise typically lie within the starting capabilities of the generator. Configuring a typical load shedding system to permit starting a large motor will typically result in inadequate protection for the generator.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A method of adding and shedding loads L1, L2, L3, L4 that are connected to a generator 12 will now be described with reference to FIG. 1. The method includes determining whether a plurality of loads L1, L2, L3, L4 is being supplied with power by the generator 12 and then determining the total load that the generator 12 is supplying to the plurality of loads L1, L2, L3, L4.

The method further includes determining whether to change a number of the loads in the plurality of loads L1, L2, L3, L4 based on the amount of load L that is being supplied by the generator 12. As shown in FIGS. 3-6, the method further includes determining an amount of time T in which to change the number of loads in the plurality of loads based on the amount of load L that is being supplied by the generator 12.

In some embodiments, determining whether a plurality of loads L1, L2, L3, L4 are being supplied with power by the generator 12 may include monitoring the position of an automatic transfer switch 13. It should be noted that the plurality of loads L1, L2, L3, L4 are being supplied with power by generator 12 when the automatic transfer switch 13 is in an emergency position.

Figure 2:
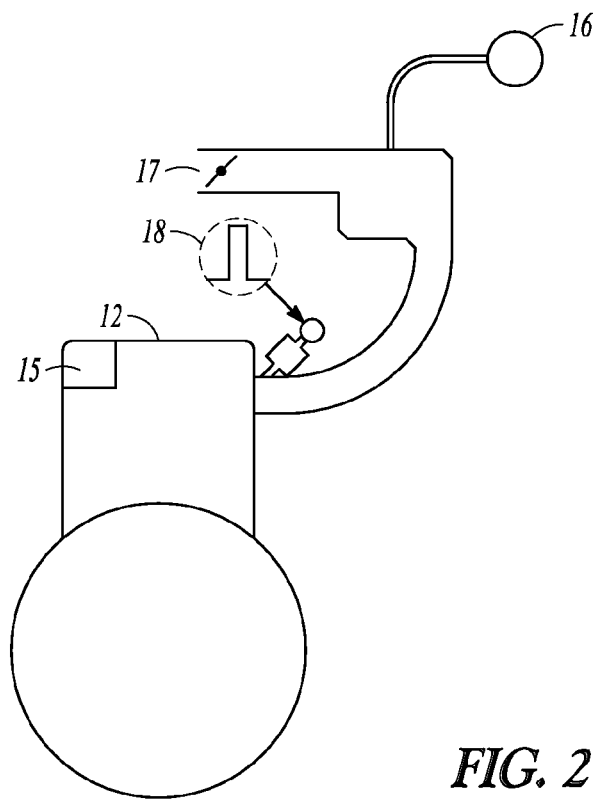
FIG. 2 illustrates an example engine driven generator that may be used with the load shedding system shown in FIG. 1.

In alternative embodiments, determining whether a plurality of loads L1, L2, L3, L4 are being supplied with power by the generator 12 may include measuring a position of a throttle 17 that is part of the generator 12 (see e.g., FIG. 2). It should be noted that the generator 12 may be established as supplying power to the plurality of loads L1, L2, L3, L4 when the throttle 17 position is in a position other than a "no load" position.

In still other embodiments, determining whether a plurality of loads L1, L2, L3, L4 are being supplied with power by the generator 12 may include monitoring the generator load L. As examples, monitoring the generator load L may be done by (i) measuring the generator 12 operating frequency; (ii) measuring the generator 12 operating voltage; and/or (iii) measuring the generator 12 current.

In addition, determining the total load L that the generator 12 is supplying to the plurality of loads L1, L2, L3, L4 may include (i) measuring the generator operating frequency; (ii) measuring the generator operating voltage; and/or (iii) measuring the generator current.

In some embodiments, determining the total load L that the generator 12 is supplying to the plurality of loads L1, L2, L3, L4 includes determining the output torque of a prime mover (i.e., an engine) of the generator 12. The output torque may be calculated by (i) measuring fuel injection time duration 18 within the generator 12; (ii) measuring the intake manifold 16 pressure within the generator 12; and/or (iii) measuring a position of a throttle 17 within the generator 12. It should be noted the output torque may be calculated for spark-ignited and compression-ignited engines as well as other types of prime movers.

Increasing the Number of Loads

In some embodiments, determining an amount of time T in which to change the number of loads in the plurality of loads L1, L2, L3, L4 may be based on the amount of load L that is being supplied by the generator 12 includes increasing the number of loads based on an available load capacity of the generator 12.

As used herein, the available load capacity of the generator 12 is the difference between the maximum loading threshold of the generator 12 and a load the generator 12 is supplying at a particular point in time. As examples, the maximum loading threshold of the generator may be adjustable by a user via a user interface 20 (see FIG. 1), and/or may be based on a rating determined by a manufacturer of the generator 12. As examples, the user interface 20 may be part of a load control module 14, automatic transfer switch 13, generator controller 15 or a stand-alone device.

Figure 3:
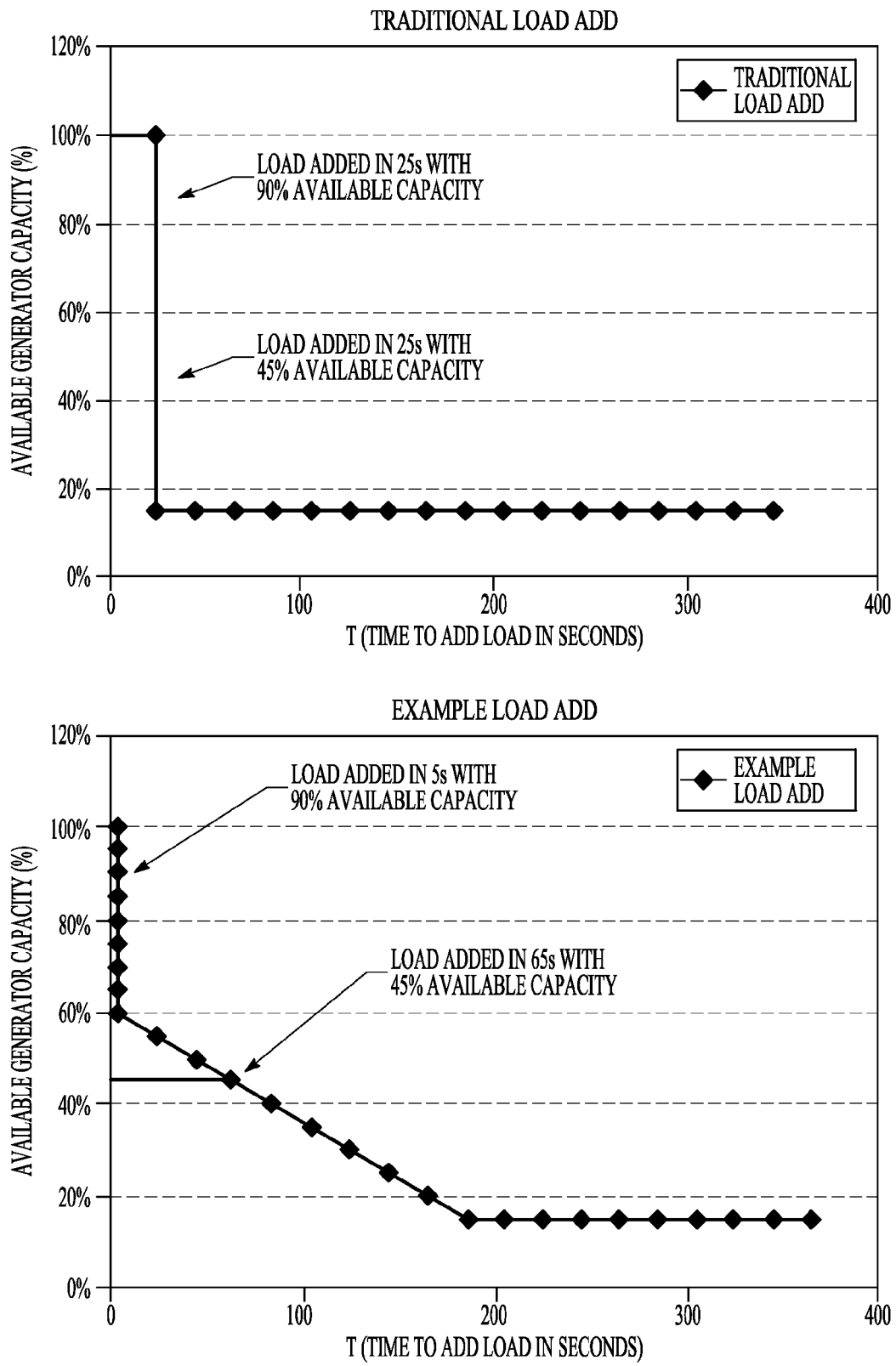
FIG. 3 illustrates an example of how time T varies when a given load is added based on the generator load L and the available generator capacity at a point in time as compared to a conventional method of adding loads.

FIG. 3 illustrates an example of how time T varies when a given load is added based on the generator load L and the available generator capacity at a point in time as compared to a conventional method of adding loads. The amount of time T to add a load is varied based on the available generator capacity. As the available generator capacity increases, the time T to add a load decreases.

Therefore, the method allows generator loads to be added more quickly when there is substantial available generator capacity and more slowly when there is limited available generator capacity. This time adjustment provides (i) improved protection to the generator as the generator approaches maximum capacity; and (ii) power load as quickly as possible when there is minimal generator loading (as compared to conventional methods).

Decreasing the Number of Loads

In some embodiments, determining an amount of time T in which to change the number of loads in the plurality of loads L1, L2, L3, L4 may be based on the amount of load L that is being supplied by the generator 12 includes decreasing the number of loads based on an overload of the generator 12.

As used herein, the overload of the generator 12 is a difference between a generator load at a particular point in time and a maximum loading threshold of the generator. As examples, the maximum loading threshold of the generator may be adjustable by a user interface 20 (see FIG. 1), and/or may be based on a rating determined by a manufacturer of the generator 12.

Figure 4:
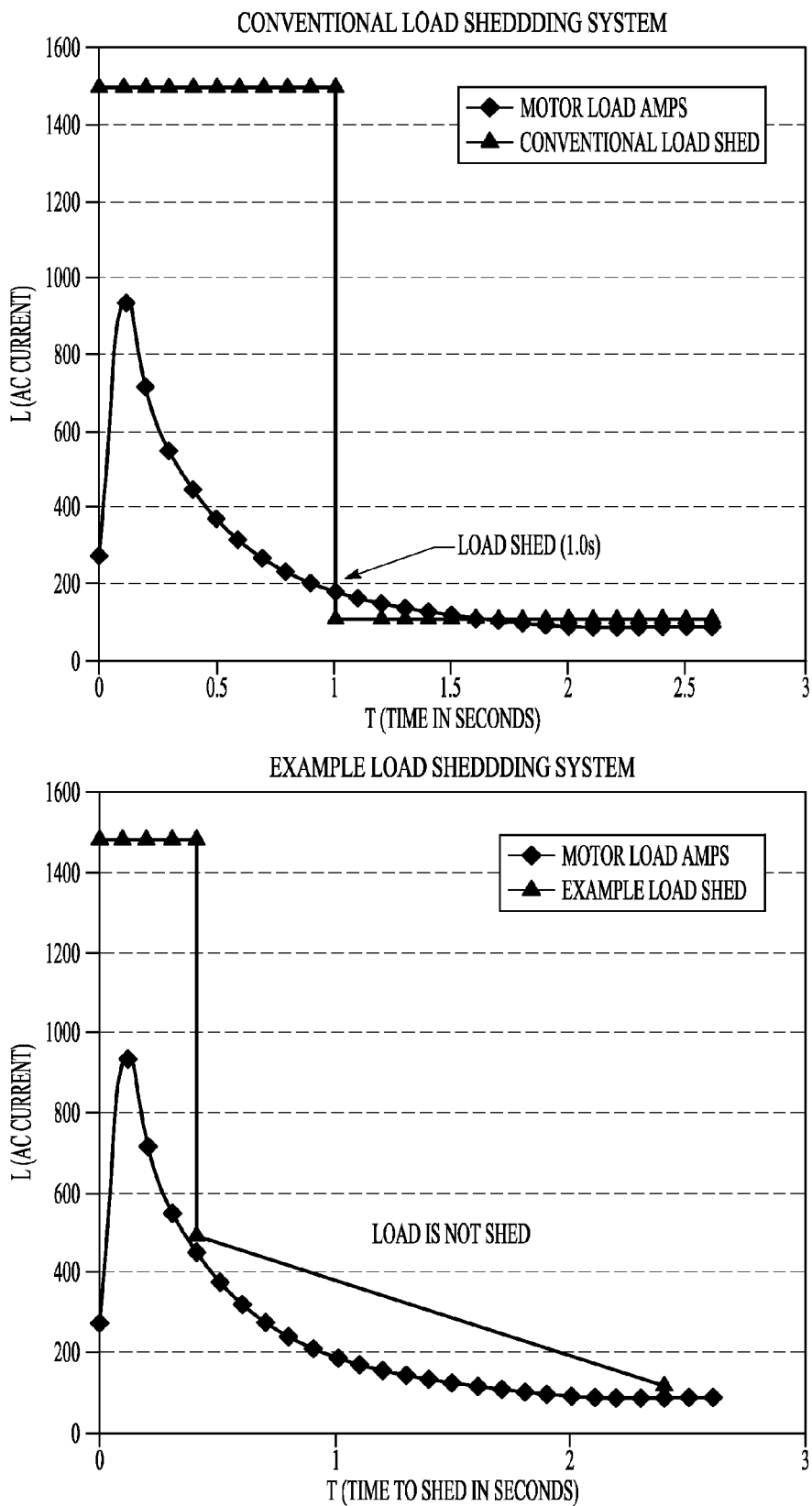
FIGS. 4 and 5 illustrate an example of how time T varies for a given load being shed based on the correspond overload of a generator as compared to a conventional method of shedding loads.
Figure 5:
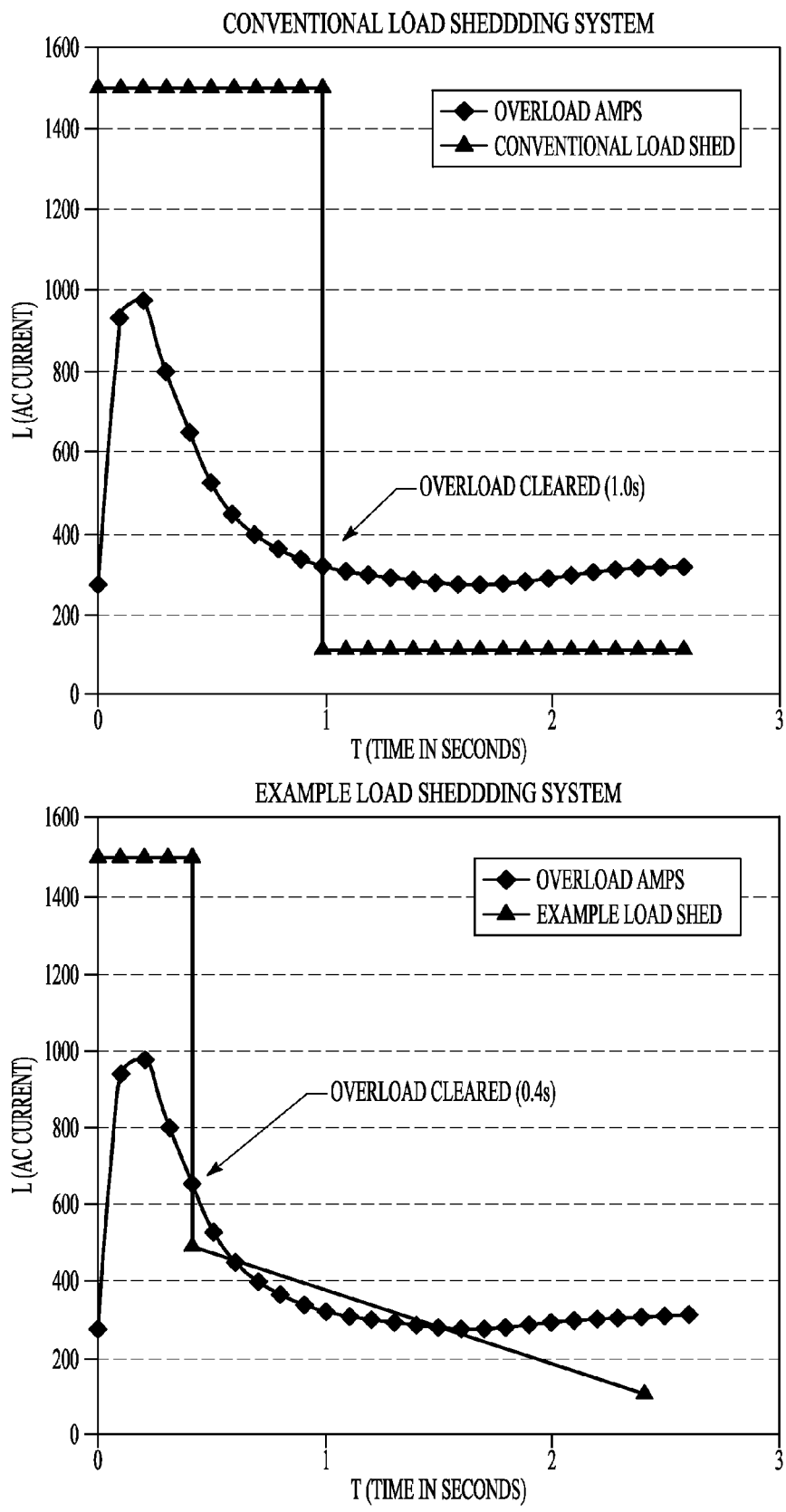

FIGS. 4 and 5 illustrate an example of how time T varies for a given load being shed based on the corresponding overload of the generator 12 as compared to a conventional method of shedding loads. The amount of time T to shed a load is varied based on the overload of the generator 12. As the overload increases, the time T to shed a load decreases.

Therefore, the method allows generator loads to be shed more quickly when there is substantial generator overload and more slowly when generator 12 is not as heavily overloaded. This time adjustment (i) provides improved protection to the generator 12 when there is substantial generator overload by shedding loads more quickly (see e.g., FIG. 4); and (ii) permits motor starting (see e.g., FIG. 5) (as compared to conventional methods).

Figure 6A:
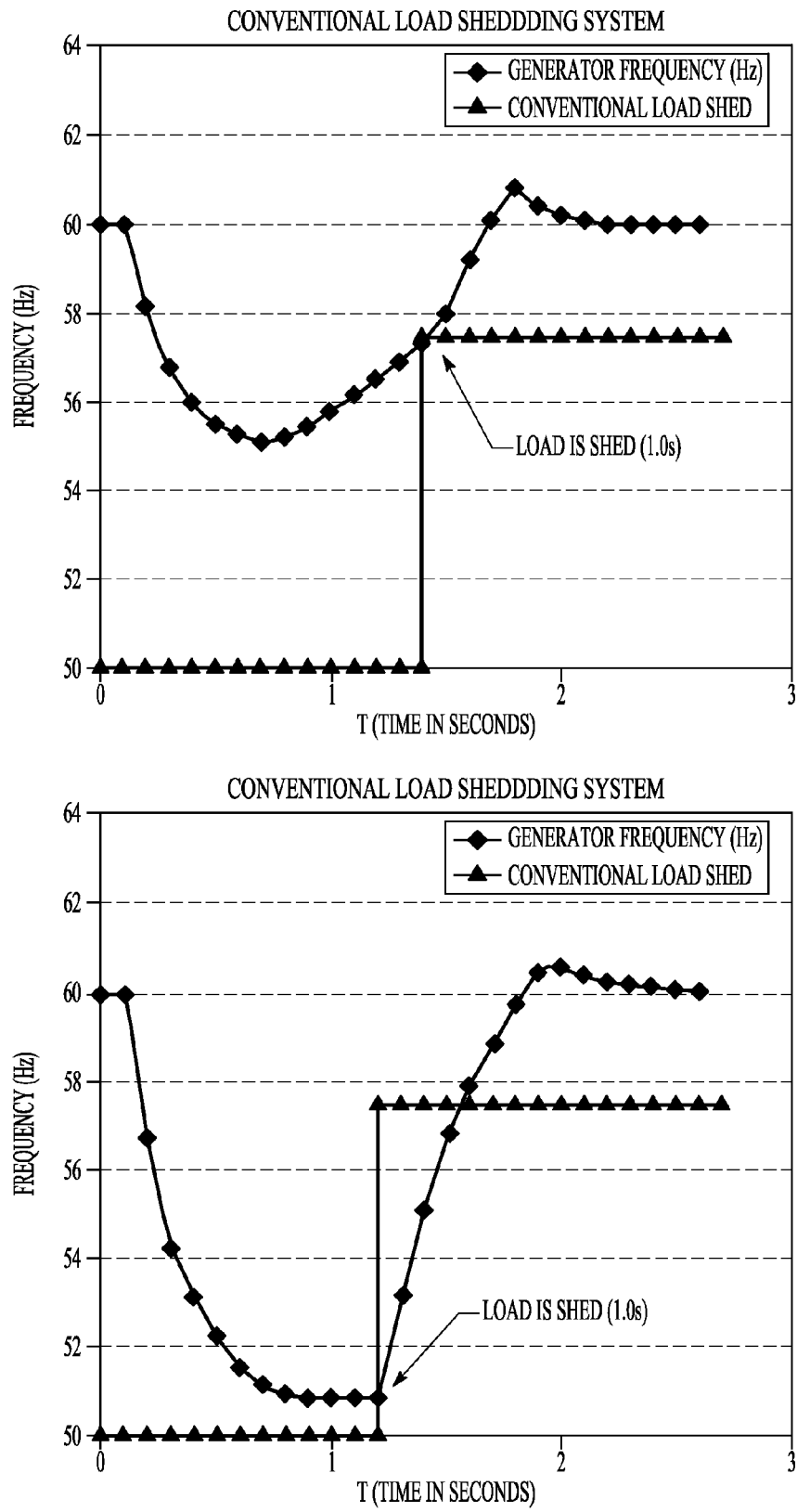
FIG. 6A shows conventional under-frequency load shedding techniques handling motor starting and overload conditions.
Figure 6B:
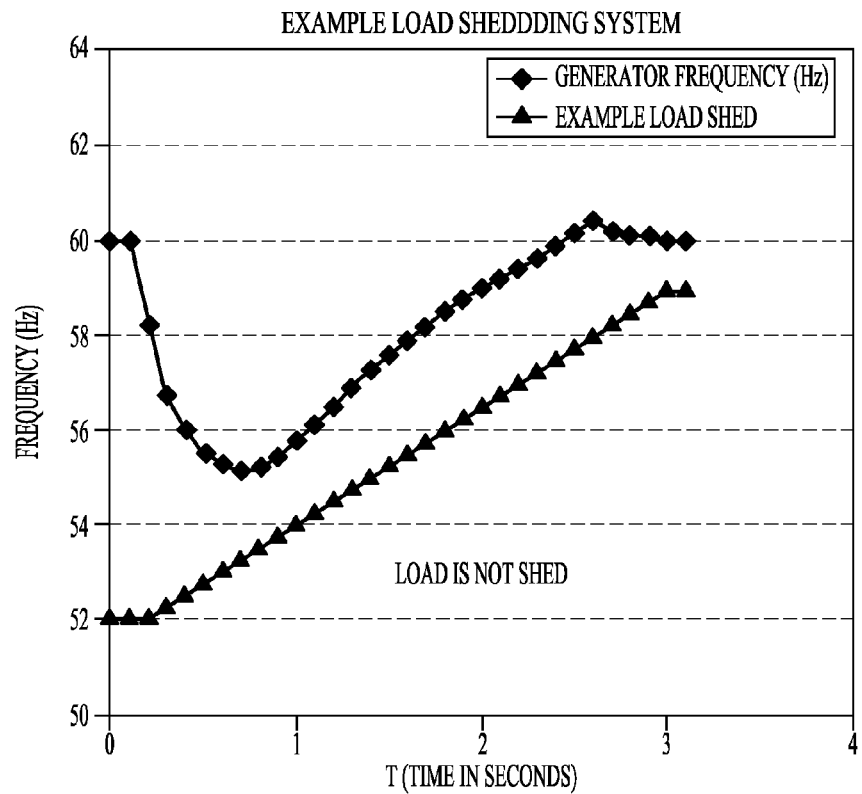
FIG. 6B shows under-frequency load shedding techniques handling motor starting and overload conditions in accordance with some example embodiments.
Figure 6B:
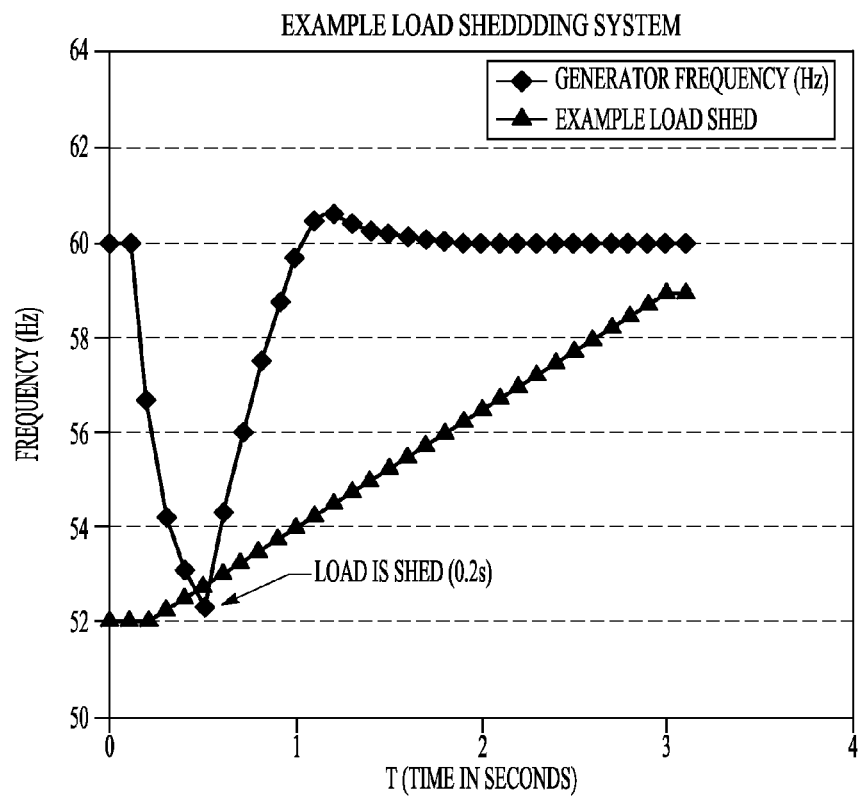

As shown in FIG. 6B, determining an amount of time in which to change the number of loads in the plurality of loads based on the amount of load that is being supplied by the generator includes decreasing the number of loads based on generator operating frequency. In some embodiments, the amount of time to decrease the number of loads will decrease as the generator operating frequency decreases.

As shown in FIG. 6A, conventional under-frequency load shedding techniques shed load after the generator has remained below a fixed threshold for a specified period of time. This type of operating parameter results in poor power quality being supplied to loads and could also result in unintended shedding during motor starting, especially when using heavily loaded large AC motors.

Comparing FIGS. 6A and 6B demonstrates how the methods described herein may improve on conventional under frequency load shedding techniques. FIG. 6A illustrates conventional under frequency load shedding techniques for a given motor starting load and a given overload while FIG. 6B illustrates the under frequency load shedding techniques described herein for the same motor starting load and the same overload.

It should be noted that while FIGS. 3, 4, 5 and 6 illustrate linear time/load curves, other embodiments are contemplated where these curves may be non-linear. The shape of these curves will depend on a variety of design considerations.

Figure 1:
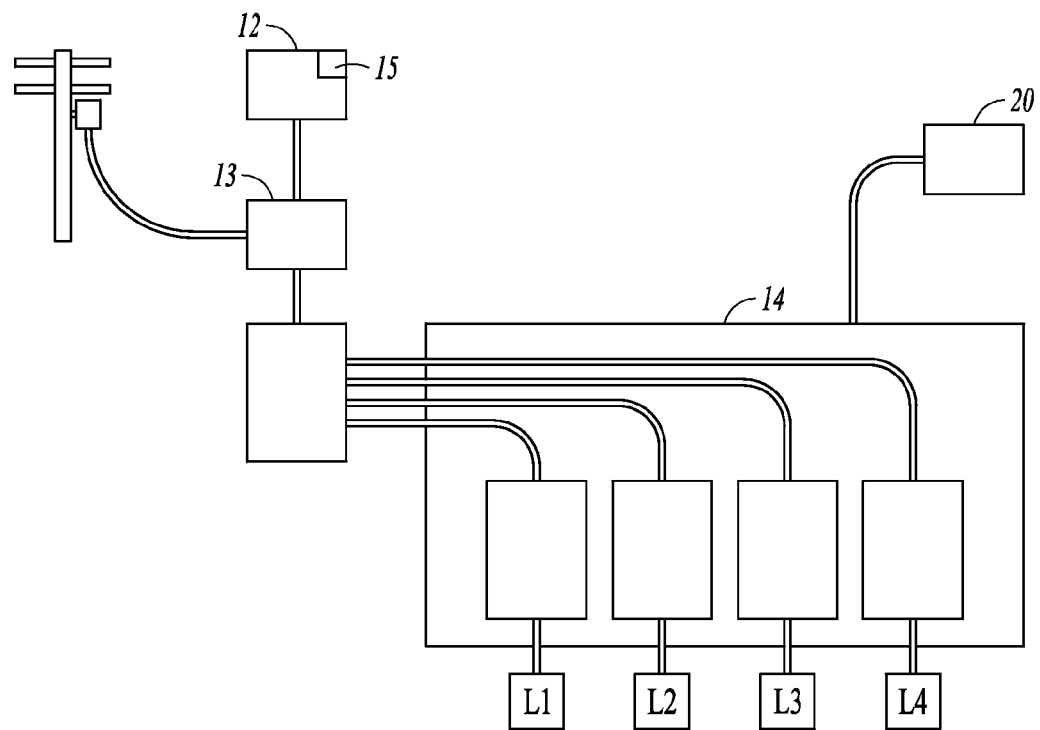
FIG. 1 illustrates an example load shedding system.
Figure 7:
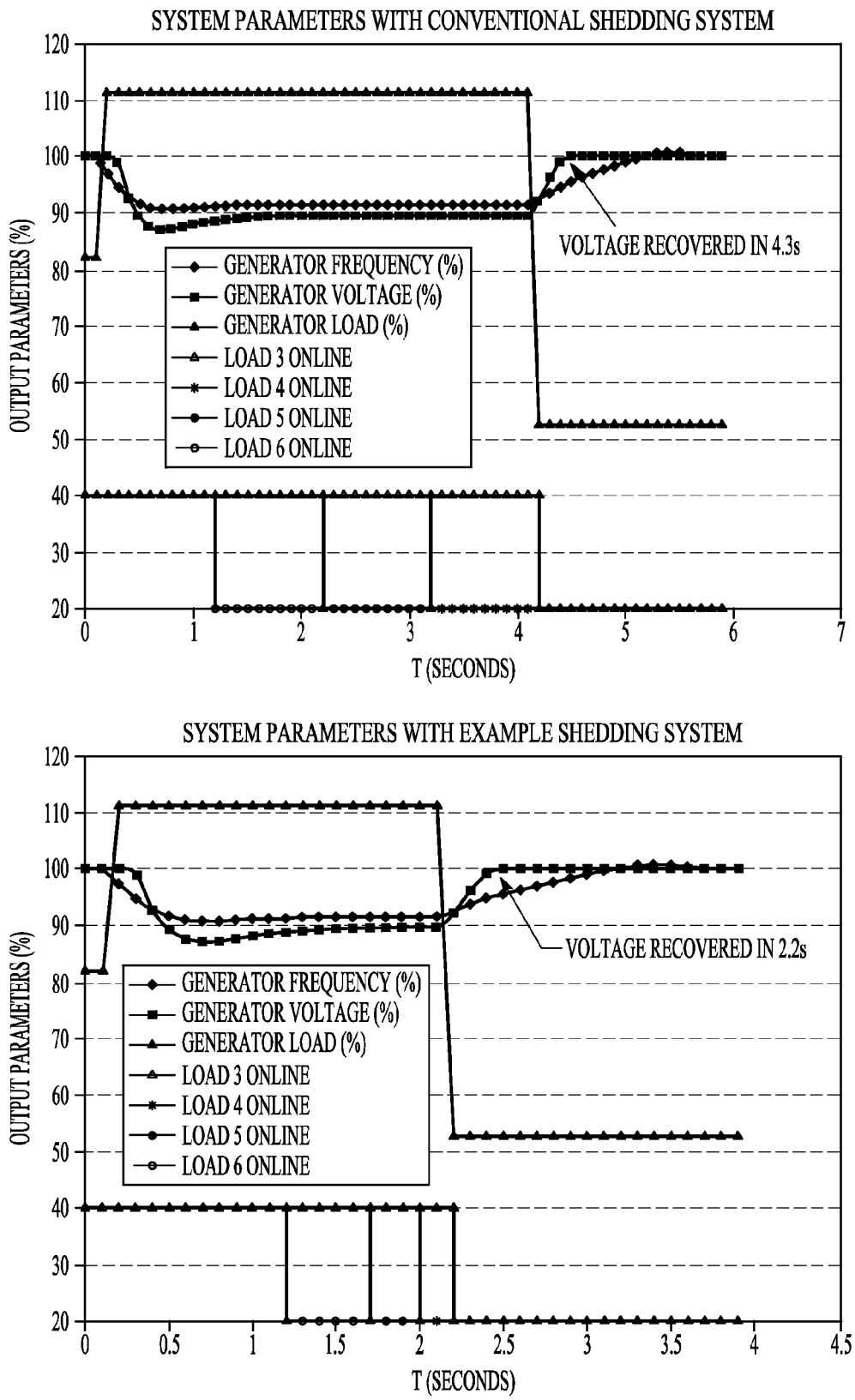
FIG. 7 illustrates decreasing the time to shed subsequent loads after a previous load shedding operation in accordance with some example embodiments.

FIGS. 1 and 7 illustrate a method of adding and shedding loads that are connected to a generator in accordance with another example embodiment. The method includes determining whether a plurality of loads L1, L2, L3, L4 is being supplied with power by the generator 12 and determining the load L that the generator is supplying to the plurality of loads L1, L2, L3, L4.

The method further includes determining whether to change a number of the loads in the plurality of loads L1, L2, L3, L4 based on the amount of load that is being supplied by the generator 12 and changing the number of loads in the plurality of loads L1, L2, L3, L4. The method further includes determining an amount of time in which to further change the number of loads where the amount of time is determined by whether the number of loads increases or decreases during the previous change of the number of loads.

In some embodiments, determining an amount of time in which to further change the number of loads in the plurality of loads L1, L2, L3, L4 includes increasing the amount of time to decrease the number of loads when the previous change of the number of loads increased the number of loads.

Other embodiments are contemplated where determining an amount of time in which to further change the number of loads in the plurality of loads includes decreasing the amount of time to decrease the number of loads when the previous change of the number of loads decreased the number of loads.

It should be noted that embodiments are also contemplated where determining an amount of time in which to further change the number of loads in the plurality of loads L1, L2, L3, L4 includes decreasing the amount of time to decrease the number of loads when the previous change of the number of loads decreased the number of loads.

In still other embodiments, determining an amount of time in which to further change the number of loads in the plurality of loads L1, L2, L3, L4 includes increasing the amount of time to increase the number of loads when the previous change of the number of loads decreased the number of loads.

FIG. 7 illustrates decreasing the time to shed subsequent loads after a previous load shedding operation. In the example scenario that is illustrated in FIG. 7, three of six loads are not demanding power from the generator which results in no decrease to the generator load when these loads are shed. The subsequent decreases in the time to shed each load allows these loads to be shed before there is significant degradation to the quality of power being supplied to these loads.

The methods described herein may permit load control operation that work well when there a variety of loads that operate under a variety of conditions. In addition, the methods may be able to more adequately handle high-priority switching loads. The methods may also reduce the time to shed multiple loads more quickly until the actual load on the power source decreases. This decrease in time to shed the appropriate load may allow the power source to remain online.

Example Machine Architecture

Figure 8:
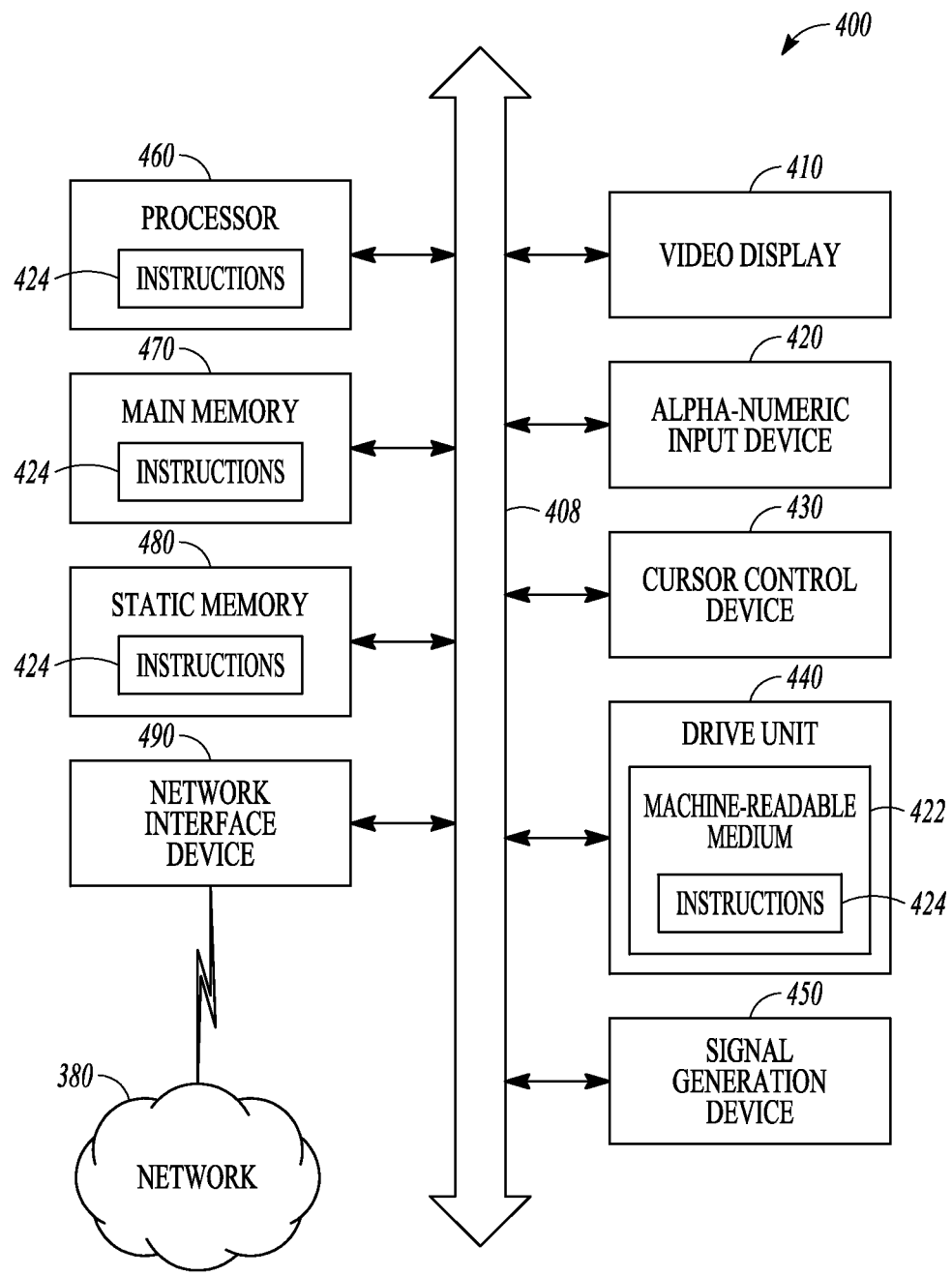
FIG. 8 is a block diagram that illustrates a diagrammatic representation of a machine in the example form of a computer system 400 within which a set of instructions for causing the machine to perform any one or more of the methodologies discussed herein may be executed.

FIG. 8 is a block diagram that illustrates a diagrammatic representation of a machine in the example form of a computer system 400 within which a set of instructions for causing the machine to perform any one or more of the methodologies discussed herein may be executed. In some embodiments, the computer system 400 may operate in the capacity of a server or a client machine in a server-client network environment, or as a peer machine in a peer-to-peer (or distributed) network environment.

The computer system 400 may be a server computer, a client computer, a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 may include a processor 460 (e.g., a central processing unit (CPU), a graphics processing unit (GPU) or both), a main memory 470 and a static memory 480, all of which communicate with each other via a bus 408. The computer system 400 may further include a video display unit 410 (e.g., liquid crystal displays (LCD) or cathode ray tube (CRT)). The computer system 400 also may include an alphanumeric input device 420 (e.g., a keyboard), a cursor control device 430 (e.g., a mouse), a disk drive unit 440, a signal generation device 450 (e.g., a speaker), and a network interface device 490.

The disk drive unit 440 may include a machine-readable medium 422 on which is stored one or more sets of instructions (e.g., software 424) embodying any one or more of the methodologies or functions described herein. The software 424 may also reside, completely or at least partially, within the main memory 470 and/or within the processor 460 during execution thereof by the computer system 400, the main memory 470 and the processor 460 also constituting machine-readable media. It should be noted that the software 424 may further be transmitted or received over a network (e.g., network 380 in FIG. 8) via the network interface device 490.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of example embodiments described herein. The term "machine-readable medium" shall accordingly be taken to include, but not be limited to, solid-state memories and optical and magnetic media.

Thus, a computerized method and system are described herein. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method of adding and shedding loads that are connected to a generator, the method comprising:

determining whether a plurality of loads is being supplied with power by the generator;
determining the load that the generator is supplying to the plurality of loads;
determining whether to change a number of the loads in the plurality of loads based on the amount of load that is being supplied by the generator;
determining an amount of time in which to change the number of loads in the plurality of loads relative to the amount of load that is being supplied by the generator, wherein the amount of time to change the number of loads varies relative to an available load capacity for the generator for all possible loads within a particular load range of loads, and wherein determining an amount of time in which to further change the number of loads in the plurality of loads includes increasing the amount of time to increase the number of loads in the plurality of loads when a previous change of the number of loads decreased the number of loads; and
changing the number of loads based on the determined amount of time.

2. The method of claim 1, wherein determining whether a plurality of loads are being supplied with power by the generator includes monitoring the generator load.

3. The method of claim 2, wherein monitoring the generator load includes measuring the generator operating frequency, generator operating voltage, or generator operating current.

4. The method of claim 2, wherein monitoring the generator load includes monitoring the torque of a prime mover within the generator.

5. The method of claim 4, wherein monitoring the torque of a prime mover within the generator includes measuring fuel injection time duration within the generator.

6. The method of claim 4, wherein monitoring the torque of a prime mover within the generator includes measuring the intake manifold pressure within the generator.

7. The method of claim 4, wherein monitoring the torque of a prime mover within the generator includes measuring a position of a throttle within the generator.

8. The method of claim 1, wherein determining the load that the generator is supplying to the plurality of loads includes measuring the current that the generator is supplying to the plurality of loads.

9. The method of claim 1, wherein determining the load that the generator is supplying to the plurality of loads includes measuring the generator operating frequency.

10. The method of claim 1, wherein determining the load that the generator is supplying to the plurality of loads includes measuring the generator operating voltage.

11. The method of claim 1, determining the load that the generator is supplying to the plurality of loads includes monitoring the torque of a prime mover within the generator.

12. The method of claim 11, wherein monitoring the torque of a prime mover within the generator includes measuring fuel injection time duration within the generator.

13. The method of claim 11, wherein monitoring the torque of a prime mover within the generator includes measuring the intake manifold pressure within the generator.

14. The method of claim 11, wherein monitoring the torque of a prime mover within the generator includes measuring a position of a throttle within the generator.

15. The method of claim 1, wherein determining an amount of time in which to change the number of loads in the plurality of loads based on the amount of load that is being supplied by the generator includes increasing the number of loads based on an available load capacity of the generator.

16. The method of claim 15, wherein the available load capacity of the generator is a difference between a maximum loading threshold of the generator and a generator load at a particular point in time.

17. The method of claim 16, wherein the maximum loading threshold of the generator is adjustable by a user.

18. The method of claim 16, wherein the maximum loading threshold of the generator is based on a rating provided by a manufacturer of the generator.

19. The method of claim 15, wherein the amount of time to increase the number of loads will increase as the available load capacity decreases.

20. The method of claim 1, wherein determining an amount of time in which to change the number of loads in the plurality of loads based on the amount of load that is being supplied by the generator includes decreasing the number of loads based on an overload of the generator.

21. The method of claim 20, wherein the overload of the generator is a difference between a generator load at a particular point in time and a maximum loading threshold of the generator.

22. The method of claim 21, wherein the maximum loading threshold of the generator is adjustable by a user.

23. The method of claim 21, wherein the maximum loading threshold of the generator is based on a rating provided by a manufacturer of the generator.

24. The method of claim 21, wherein the amount of time to decrease the number of loads will decrease as the generator overload increases.

25. The method of claim 1, wherein determining an amount of time in which to change the number of loads in the plurality of loads based on the amount of load that is being supplied by the generator includes decreasing the number of loads based on generator operating frequency.

26. The method of claim 25, wherein the amount of time to decrease the number of loads will decrease as the generator operating frequency decreases.

27. A method of adding and shedding loads that are connected to a generator, the method comprising:
determining whether a plurality of loads is being supplied with power by the generator;
determining the load that the generator is supplying to the plurality of loads;
determining whether to change a number of the loads in the plurality of loads based on the amount of load is being supplied by the generator;
changing the number of loads in the plurality of loads;
determining an amount of time in which to further change the number of loads in the plurality of loads, wherein the amount of time is determined by whether the number of loads increases or decreases during the previous change of the number of loads, wherein determining an amount of time in which to further change the number of loads in the plurality of loads includes increasing the amount of time to increase the number of loads in the plurality of loads when the previous change of the number of loads decreased the number of loads; and
changing the number of loads based on the determined amount of time.

28. The method of claim 27, wherein determining an amount of time in which to further change the number of loads in the plurality of loads includes increasing the amount of time to decrease the number of loads in the plurality of loads when the previous change of the number of loads increased the number of loads.

29. The method of claim 27, wherein determining an amount of time in which to further change the number of loads in the plurality of loads includes decreasing the amount of time to increase the number of loads in the plurality of loads when the previous change of the number of loads increased the number of loads.

30. The method of claim 27, wherein determining an amount of time in which to further change the number of loads in the plurality of loads includes decreasing the amount of time to decrease the number of loads in the plurality of loads when the previous change of the number of loads decreased the number of loads.

\* \* \* \* \*